United States Patent
Inoue et al.

(10) Patent No.: US 8,301,350 B2
(45) Date of Patent: Oct. 30, 2012

(54) VEHICLE CONTROL APPARATUS

(75) Inventors: Yuji Inoue, Nissin (JP); Naoki Nishimura, Nagoya (JP); Tsuyoshi Sato, Toyota (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 150 days.

(21) Appl. No.: 12/720,392

(22) Filed: Mar. 9, 2010

(65) Prior Publication Data

US 2010/0168954 A1 Jul. 1, 2010

Related U.S. Application Data

(63) Continuation of application No. PCT/JP2008/065390, filed on Aug. 28, 2008.

(30) Foreign Application Priority Data

Sep. 11, 2007 (JP) .................... 2007-235373

(51) Int. Cl.
*F16H 61/12* (2010.01)
*F16H 61/18* (2006.01)

(52) U.S. Cl. ............... 701/62; 701/22; 701/51; 701/52; 701/63; 701/64

(58) Field of Classification Search .............. 701/29, 701/29.5, 62, 63; 475/117
See application file for complete search history.

(56) References Cited

U.S. PATENT DOCUMENTS

| | | | |
|---|---|---|---|
| 5,022,285 A | 6/1991 | Suzuki | |
| 6,230,576 B1 | 5/2001 | Yamada et al. | |
| 7,349,770 B2 * | 3/2008 | Matsuzaki et al. | 701/1 |
| 7,399,257 B2 * | 7/2008 | Katou et al. | 477/98 |
| 7,828,695 B2 * | 11/2010 | Inoue et al. | 477/34 |
| 2004/0067810 A1 | 4/2004 | Fujimine et al. | |
| 2010/0256880 A1 * | 10/2010 | Sato | 701/55 |

FOREIGN PATENT DOCUMENTS

| | | | |
|---|---|---|---|
| JP | 2000-170905 A | 6/2000 | |
| JP | 2004-036673 A | 2/2004 | |
| JP | 2004-125061 A | 4/2004 | |
| JP | 2005-331050 A | 12/2005 | |
| JP | 2006-219001 A | 8/2006 | |
| JP | 2007-100550 A | 4/2007 | |

* cited by examiner

*Primary Examiner* — Mary Cheung
*Assistant Examiner* — Jerrah Edwards
(74) *Attorney, Agent, or Firm* — Sughrue Mion, PLLC

(57) ABSTRACT

In a control apparatus of a vehicle according to an embodiment of the present invention, there is a failsafe control that blocks power transmission from a drive source to drive wheels by releasing clutches of an automatic transmission when there is a shift switching failure. In consideration of the fact that when a working oil temperature of the automatic transmission is low (below the freezing point, for example), the viscosity of the working oil is high and response for power blocking is poor, in a case where an oil temperature at the time of a shift switching request is low (steps ST2 and ST3), the power transmission is blocked by releasing the clutches of the automatic transmission at the same time as the shift switching request (step ST11). Thus, a clutch release delay occurring when there is a shift switching failure at a low oil temperature is prevented.

5 Claims, 7 Drawing Sheets

FIG.3

|   |         | C1 | C2 | C3 | C4 | B1 | B2 | B3 | B4 | F0 | F1 | F2 | F3 |
|---|---------|----|----|----|----|----|----|----|----|----|----|----|----|
| P | Parking |    |    |    |    |    |    |    |    |    |    |    |    |
| R | Reverse |    |    | X  |    | Y  |    |    | X  |    | X  |    |    |
| N | Neutral |    |    |    |    |    |    |    |    |    |    |    |    |
| D | 1st     | X  |    |    | Y  |    |    |    | Y  | X  |    |    | X  |
| D | 2nd     | X  |    |    | Y  |    | Y  | X  |    | X  | X  | X  |    |
| D | 3rd     | X  |    | X  | Y  | Y  |    | Z  |    | X  | X  |    |    |
| D | 4th     | X  | X  | Z  | Y  |    |    | Z  |    | X  |    |    |    |
| D | 5th     | Z  | X  | X  |    | X  |    | Z  |    |    |    |    |    |
| D | 6th     | Z  | X  |    |    | Z  | X  | Z  |    |    |    |    |    |

X: Engagement
Y: Engagement during engine braking
Z: Engagement unrelated to power transmission

VEHICLE CONTROL APPARATUS

TECHNICAL FIELD

The present invention relates to a control apparatus of a vehicle in which a by-wire shift-switching apparatus that switches a shift range of an automatic transmission using an actuator is mounted.

BACKGROUND ART

In a vehicle in which an engine (internal combustion engine) is mounted, as a transmission that appropriately transmits the torque and rotational speed generated by the engine to drive wheels according to the vehicle running state, an automatic transmission is known that automatically optimally sets a gear ratio between the engine and the drive wheels.

As an automatic transmission mounted in a vehicle, there are, for example, a planetary gear transmission that sets gears using clutches, brakes, and a planetary gear apparatus, and a belt-driven stepless transmission (CVT: continuously variable transmission) that steplessly adjusts the gear ratio.

In a vehicle in which a planetary gear automatic transmission is mounted, a gearshift map that has gearshift lines (gear switching lines) for obtaining an optimal gear according to a vehicle speed and a throttle opening degree (or an accelerator opening degree) is stored in an ECU (electronic control unit) or the like, a target gear is calculated with reference to the gearshift map based on the vehicle speed and the throttle opening degree, and based on that target gear, a gear (gear position) is automatically set by engaging or releasing a clutch, a brake, a one-way clutch, and the like, which are frictionally engaging elements, in a predetermined state.

Furthermore, in a belt-driven stepless transmission, a belt is wrapped around a primary pulley (input-side pulley) provided with a pulley groove (V groove) and a secondary pulley (output-side pulley). At the same time that the groove width of the pulley groove of one pulley expands, the groove width of the pulley groove of the other pulley narrows, and, thus, the belt contact radius (effective diameter) of the belt relative to each pulley is continuously varied to steplessly set the gear ratio.

As a control apparatus that controls such an automatic transmission, there is a so-called by-wire shift-switching apparatus (see PTL 1, for example) that electrically detects the position of the shift range of the automatic transmission using a sensor, and by driving an actuator of an electric motor or the like for shift switching based on this detection signal to switch a manual valve of the automatic transmission, switches a shift position such as P (parking), R (reverse), N (neutral), and D (drive).

In such a by-wire shift-switching apparatus, it is not necessary for a shift lever and a shift range-switching mechanism to be mechanically linked as in an ordinary shift-switching apparatus, that is, a shift-switching apparatus in which a shift range of an automatic transmission is directly switched by a driver operating a shift lever. Accordingly, the layout when mounting these constituent elements in the vehicle is not restricted, and, thus, there are the advantages that it is possible to increase the degree of freedom in design, and also that installation in the vehicle can be easily performed.

In a vehicle in which a by-wire shift-switching apparatus is mounted, there is a technique described in PTL 2, as a failsafe control performed when a problem has occurred in shift switching.

With the technology described in PTL 2, in an automatic transmission that employs a shift by-wire control, a gearshift range position (target range position) that has been obtained through a switching operation for shift selection performed by a driver is compared with an actual range position of the automatic transmission, and when these are not the same, a judgment is made that a problem has occurred in the automatic transmission. When judged that a problem has occurred in the automatic transmission, by blocking a power transmission path from an output shaft of the engine via the automatic transmission to the drive wheels, vehicle movement in a shift range position different from the shift position selected by the driver is prevented.

Also, with the technology described in PTL 2, for example, the power transmission path is blocked by releasing a forward frictionally engaging element (clutch) or rearward frictionally engaging elements (clutch and brake) of the automatic transmission.

CITATION LIST

Patent Literature

[PTL 1]
JP 2000-170905A
[PTL 2]
JP 2004-125061A

DISCLOSURE OF INVENTION

Problem to be Solved by the Invention

Here, in a vehicle in which a by-wire shift-switching apparatus is mounted, as described above, although a failsafe control is performed that blocks power transmission (hereinafter, also referred to as "power block") when a shift switching failure (for example, the target range position and the actual range position are not the same) has occurred, the power block may be delayed depending on the condition when a shift switching failure has occurred.

For example, in the case where the power transmission is blocked by releasing frictionally engaging elements such as clutches and brakes of the automatic transmission (hereinafter, the frictionally engaging elements may be simply referred to as "clutches"), if the working oil temperature of the automatic transmission when a shift switching failure has occurred is low (below the freezing point, for example), the viscosity of the working oil increases, and the response becomes poor. Thus, clutch release (power block) takes time. If the time lag of clutch release (period from release instruction to actual release completion) is long in this manner, the clutch release may be too late when a shift switching failure has occurred, and the driver may feel discomfort due to the vehicle movement (vehicle movement different from that in a shift switching request).

In consideration of this point, in the case where a control is performed that releases the clutch of the automatic transmission at an early time point, the release-side clutch of the automatic transmission may be released earlier than in an ordinary control when the working oil temperature is not low, and a shock may be generated during a proper operation (during proper shift switching). More specifically, for example, when there is a shift switching request from the R range to the D range in a state where the current shift range is the R range and the rearward clutch of the automatic transmission is engaged, if the rearward clutch is released (clutch is turned off) earlier than in an ordinary control, the forward clutch starts to become engaged in a state where the rearward clutch is completely released (neutral state), and, thus, a shock (garage shock) may be generated when the forward clutch becomes engaged. Furthermore, also when there is a shift switching request from the D range to the R range, a garage shock may be generated in a similar manner.

The present invention was made in view of these circumstances, and it is an object thereof to realize a control that can block power transmission at an appropriate time when there is a shift switching failure, in a control apparatus of a vehicle in which a by-wire shift-switching apparatus that switches a shift range of an automatic transmission using an actuator is mounted.

Means for Solving the Problems

The present invention is based on a control apparatus of a vehicle in which a by-wire shift-switching apparatus that switches a shift range using an actuator is mounted. This sort of control apparatus of a vehicle includes: a hydraulic power-blocking means for blocking power transmission from a drive source to drive wheels of the vehicle; and an oil temperature-detecting means for detecting a working oil temperature of the power-blocking means; wherein, in a case where the working oil temperature is low, the power transmission is blocked earlier than in a case where the working oil temperature is high.

According to the present invention, in consideration of the fact that response for power blocking when a working oil temperature of the power-blocking means is low is inferior to that when the working oil temperature is high, in a case where a working oil temperature of the power-blocking means is low, the power transmission is blocked earlier than in a case where the working oil temperature is high. Thus, an operating delay in blocking power (a clutch release delay, for example) in the case where an oil temperature is low can be reduced. Moreover, since response for power blocking is good in the case where an oil temperature is not low, an operating delay in blocking power does not occur even when the power transmission is blocked after a shift switching failure is detected. In this manner, transmission power when there is a range switching failure can be blocked at an appropriate time without being particularly influenced by the temperature state of working oil in the power-blocking means.

As another specific solving means, the present invention is directed to a control apparatus of a vehicle in which a by-wire shift-switching apparatus that switches a shift range using an actuator is mounted, including: a hydraulic power-blocking means for blocking power transmission from a drive source to drive wheels of the vehicle; an oil temperature-detecting means for detecting a working oil temperature of the power-blocking means; and a failure-detecting means for detecting a failure of the shift-switching apparatus (hereinafter, also referred to as a "shift switching failure"); wherein, in a case where the working oil temperature is lower than a preset threshold, the power transmission is blocked regardless of a result of the failure detection. More specifically, in a case where the working oil temperature is at least the threshold, the power transmission is blocked based on the failure detection.

Furthermore, as another configuration, the present invention is directed to a control apparatus of a vehicle in which a by-wire shift-switching apparatus that switches a shift range using an actuator is mounted, including: a hydraulic power-blocking means for blocking power transmission from a drive source to drive wheels of the vehicle; an oil temperature-detecting means for detecting a working oil temperature of the power-blocking means; and a failure-detecting means for detecting a failure of the shift-switching apparatus; wherein, in a case where the working oil temperature is lower than a preset threshold, the power transmission is blocked before a problem in the shift switching is detected.

According to the thus configured control apparatus of a vehicle, when there is a shift switching request in a state where power is transmitted from a drive source to drive wheels, if the working oil temperature at the time of the shift switching request is lower than the threshold (below the freezing point, for example), the power transmission is blocked earlier than in an ordinary control (more specifically, power is blocked at the same time as the shift switching request), and, thus, an operating delay in blocking power does not occur. Accordingly, even in the case where a shift switching failure occurs at a low oil temperature, the power transmission can be blocked at an appropriate time.

Next, a more specific configuration of the present invention will be described by way of an example in which the power transmission is blocked by releasing frictionally engaging elements (clutches) of an automatic transmission mounted in a vehicle. In this case, the control is performed by detecting a working oil temperature of the automatic transmission.

First, when there is a shift switching request [from the R range to the drive range (D range)] in a state where the current shift range of the automatic transmission is set to, for example, the reverse range (R range), if the oil temperature at the time of the shift switching request is lower than the threshold (below the freezing point, for example), the release-side clutch of the automatic transmission is released at the same time as the shift switching request to put the automatic transmission in a neutral state, and the power transmission is blocked. When the working oil temperature is low in this manner, by releasing the clutches of the automatic transmission (releasing a hydraulic pressure) at the same time as the shift switching request, even in the case where a shift switching failure occurs at a low oil temperature, vehicle movement (rearward) can be prevented, and the driver feels no discomfort.

On the other hand, when the working oil temperature is not low (at least the threshold), response for clutch release is good, and, thus, even when the clutches are released (the power is blocked) after a shift switching failure is detected, no clutch release delay occurs, and vehicle movement (rearward) can be prevented (ordinary control when there is a failure). When the working oil temperature is not low and the shift-switching apparatus is properly operating, by releasing the release-side clutch (rearward clutch) of the automatic transmission through an ordinary control appropriate for shift range switching [from the R range to the D range], a shock (garage shock) occurring when the engagement-side clutch (forward clutch) becomes engaged can be suppressed.

Effects of the Invention

According to the present invention, in a control apparatus of a vehicle in which a by-wire shift-switching apparatus that switches a shift range of an automatic transmission using an actuator is mounted, power transmission can be blocked at an appropriate time when there is a shift switching failure, without being particularly influenced by the temperature state of working oil for blocking power transmission from a drive source to drive wheels of the vehicle.

BRIEF DESCRIPTION OF DRAWINGS

FIG. 3 is an operation table of the automatic transmission shown in FIG. 2.

REFERENCE SIGNS LIST

Figure 1:
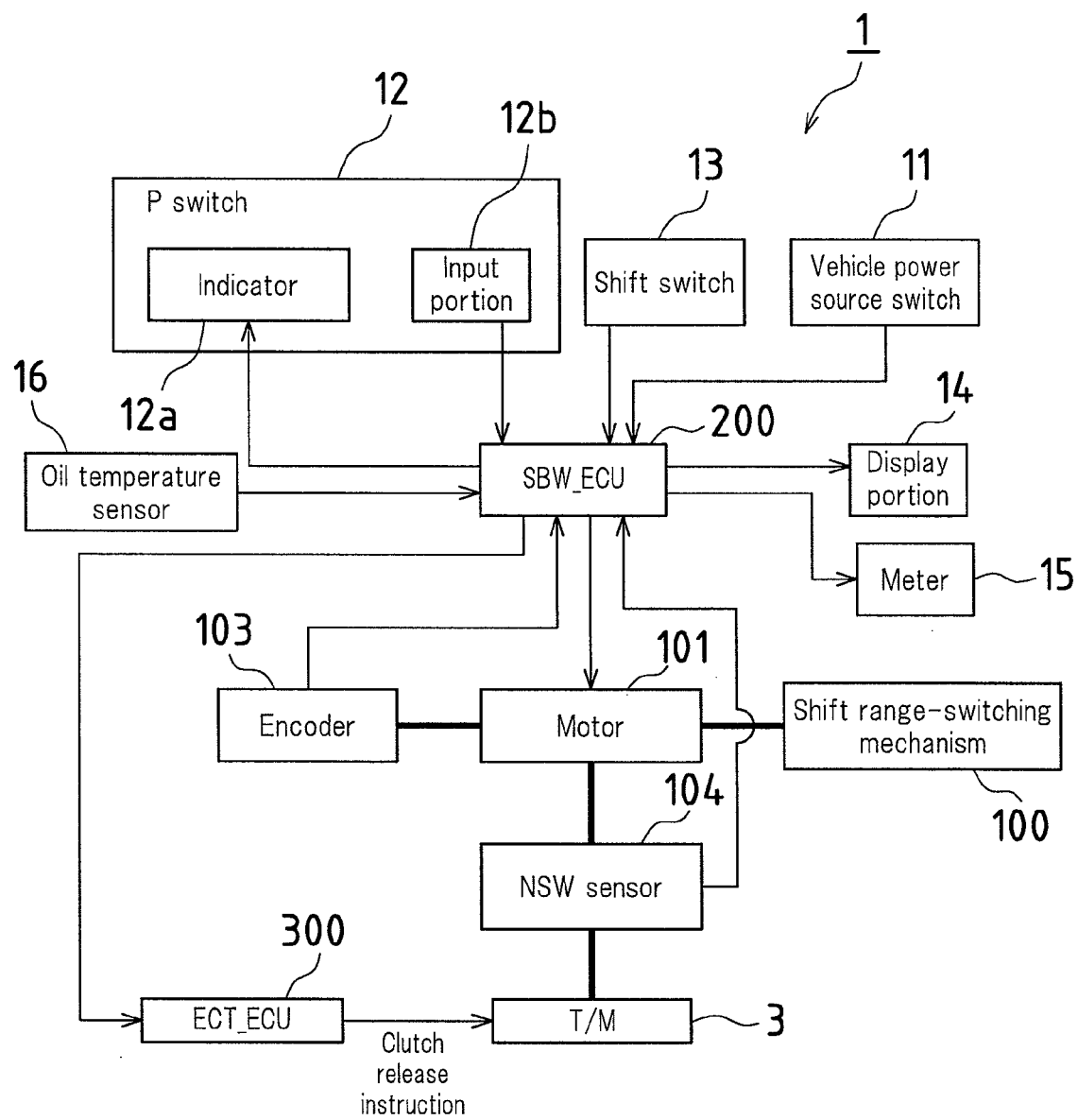
FIG. 1 is a block diagram showing the configuration of a control system of a shift-switching apparatus of the present invention.

1 Shift-switching apparatus
11 Vehicle power source switch
12 P switch
13 Shift switch
100 Shift range-switching mechanism
101 Motor (actuator)
103 Encoder
104 NSW sensor
105 Output shaft
106 Detent lever
107 Detent spring
108 Roller
200 SBW_ECU
3 Automatic transmission
C1, C3 Clutch (Power-blocking means)
300 ECT_ECU
301 Hydraulic control circuit
302 Manual valve

BEST MODE FOR CARRYING OUT THE INVENTION

Hereinafter, embodiments of the present invention will be described with reference to the drawings.

FIG. 1 is a block diagram showing the schematic configuration of a by-wire shift-switching apparatus that is mounted in a vehicle.

A shift-switching apparatus 1 of this example is an apparatus that switches a shift range of an automatic transmission 3 mounted in a vehicle, and includes a vehicle power source switch 11, a P switch 12, a shift switch 13, a display portion 14, a meter 15, a shift range-switching mechanism 100, a motor 101 that drives the shift range-switching mechanism 100, an encoder 103 that detects the rotational angle of a rotor of the motor 101, an NSW (non-contact neutral switch) sensor 104, an SBW_ECU (shift by-wire_ECU) 200, and the like. The shift-switching apparatus 1 functions as a shift by-wire apparatus that switches a shift range of the automatic transmission 3 through an electric control.

The vehicle power source switch 11 is a switch for switching on/off of the vehicle power source. There is no specific limitation on the vehicle power source switch 11, but it is, for example, an ignition switch. An instruction received by the vehicle power source switch 11 from a user such as a driver is transmitted to the SBW_ECU 200. Then, when the vehicle power source switch 11 is turned on, electrical power is supplied from a battery (not shown) mounted in the vehicle, and the shift-switching apparatus 1 starts.

The P switch 12 is a switch for switching the shift range from a non-parking range (non-P range) to the parking range (P range), and includes an indicator 12a for showing the switch state to a driver, an input portion 12b that receives an instruction from the driver, and the like. When a driver operates the input portion 12b (ON operation), an instruction to set the shift range to the P range can be input. The instruction made through the operation on the input portion 12b (instruction to set the shift range to the P range) is input to the SBW_ECU 200. Here, the input portion 12b can be realized, for example, as a momentary switch.

The shift switch 13 is a switch that is operated by a driver. Through an operation on the shift switch 13, the shift range of the automatic transmission 3 can be switched between the P range, the reverse range (R range), the neutral range (N range), and the drive range (D range). Furthermore, when the shift range is set to the P range, the P range can be canceled. When the shift switch 13 is operated by a driver, the operation information is input to the SBW_ECU 200.

The display portion 14 displays instructions, warnings and the like to a driver. The meter 15 displays a vehicle device state, a shift range state, and the like. The display of the display portion 14 and the meter 15 is controlled by the SBW_ECU 200.

Figure 4:
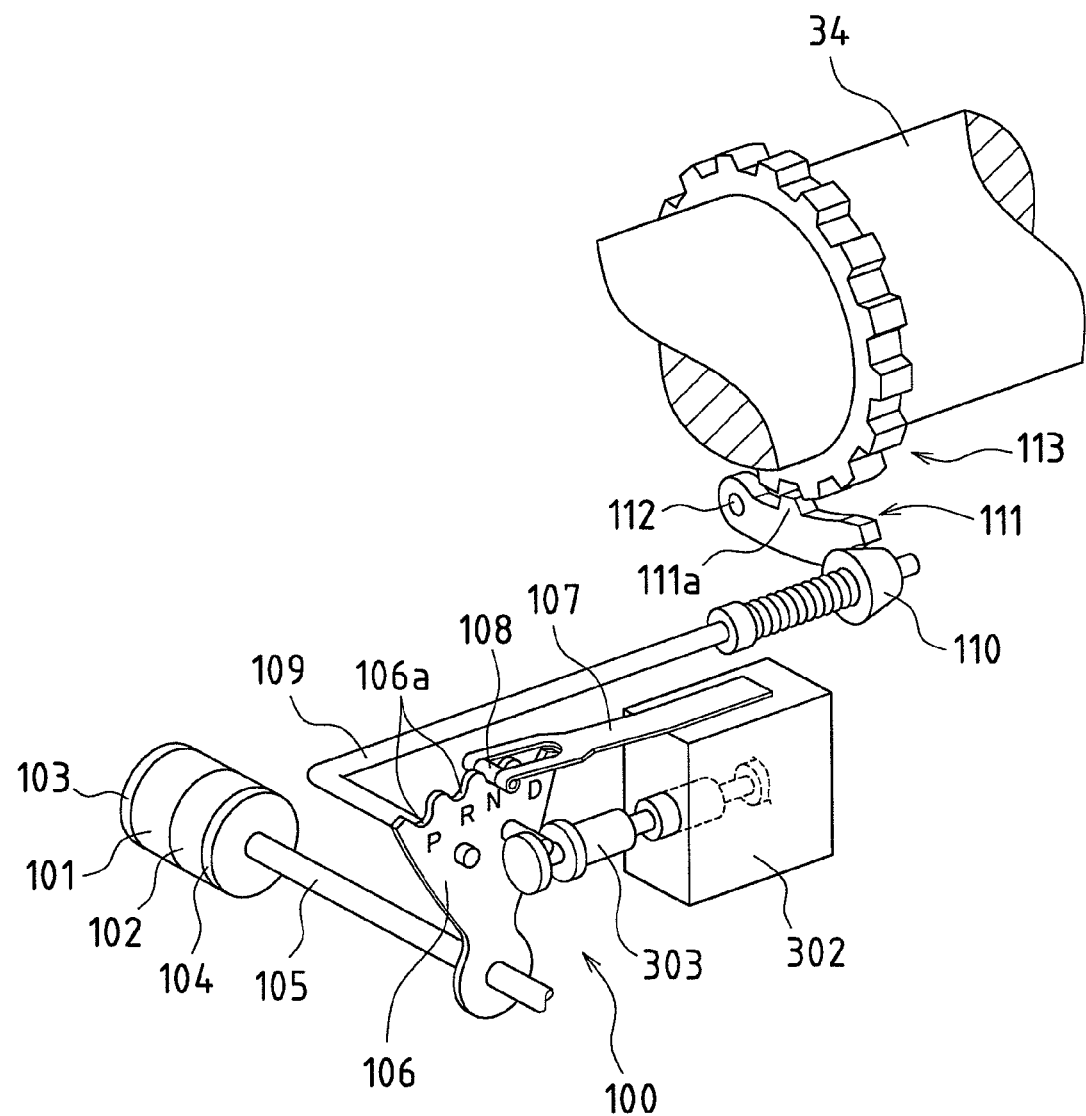
FIG. 4 is a perspective view showing the schematic configuration of a range-switching mechanism.

The NSW sensor 104 is configured from a rotational angle sensor (a potentiometer, for example) that linearly changes an output signal (output voltage) according to the rotational angle of an output shaft 105 of the shift range-switching mechanism 100 (described later, see FIG. 4). The current rotational angle of the output shaft 105 (the rotational angle of a detent lever 106 (described later)) can be detected based on that output signal. Furthermore, the shift range position can be detected based on the output signal from the NSW sensor 104. The rotational angle detected by the NSW sensor 104 is input to the SBW_ECU 200.

The SBW_ECU 200 is an electronic control unit configured mainly from a microcomputer, and includes a CPU, a ROM, a RAM, a backup RAM, and the like. The ROM stores various control programs including programs for controlling drive of the motor 101, which is an actuator of the shift-switching apparatus 1, maps referred to when executing the various control programs, and the like. The CPU executes computational processing based on the various control programs and the maps stored in the ROM. Furthermore, the RAM is a memory that temporarily stores, for example, a result of the computational processing with the CPU, and data input from sensors or the like. The backup RAM is a non-volatile memory.

The SBW_ECU 200 performs overall management of the operation of the shift-switching apparatus 1. For example, the SBW_ECU 200 performs a drive control of the motor 101 of the range-switching mechanism 100 (FIG. 4) in order to switch the shift range between the P range and a non-P range, and displays the current shift range state on the indicator 12a. More specifically, for example, when a driver operates the input portion 12b (switch ON) in a state where the shift range is a non-P range, the SBW_ECU 200 switches the shift range to the P range, and displays, on the indicator 12a, information to the effect that the current shift range is the P range.

Furthermore, the SBW_ECU 200 performs a control that switches a shift range of the automatic transmission 3 (a drive control of the motor 101) according to the shift range instructed by a driver operating the shift switch 13, and displays the current shift range state on the meter 15. Furthermore, the SBW_ECU 200 displays instructions, warnings, and the like to a driver on the display portion 14.

The SBW_ECU 200 is connected such that it can exchange data with an ECT_ECU (electronic controlled automatic transmission_ECU) 300, and transmits, for example, shift position information and a clutch release instruction (described later) to the ECT_ECU 300. The ECT_ECU 300 is an electronic control unit for mainly controlling the automatic transmission 3. The ECT_ECU 300 also includes a CPU, a ROM, a RAM, a backup RAM, and the like. Furthermore, an oil temperature sensor 16 is connected to the SBW_ECU 200. The oil temperature sensor 16 is disposed in a valve body of the automatic transmission 3, and detects the temperature of working oil (ATF) in the automatic transmission 3.

Next, the automatic transmission 3, the shift range-switching mechanism 100, and shift switching control will be described.

Automatic Transmission

Figure 2:
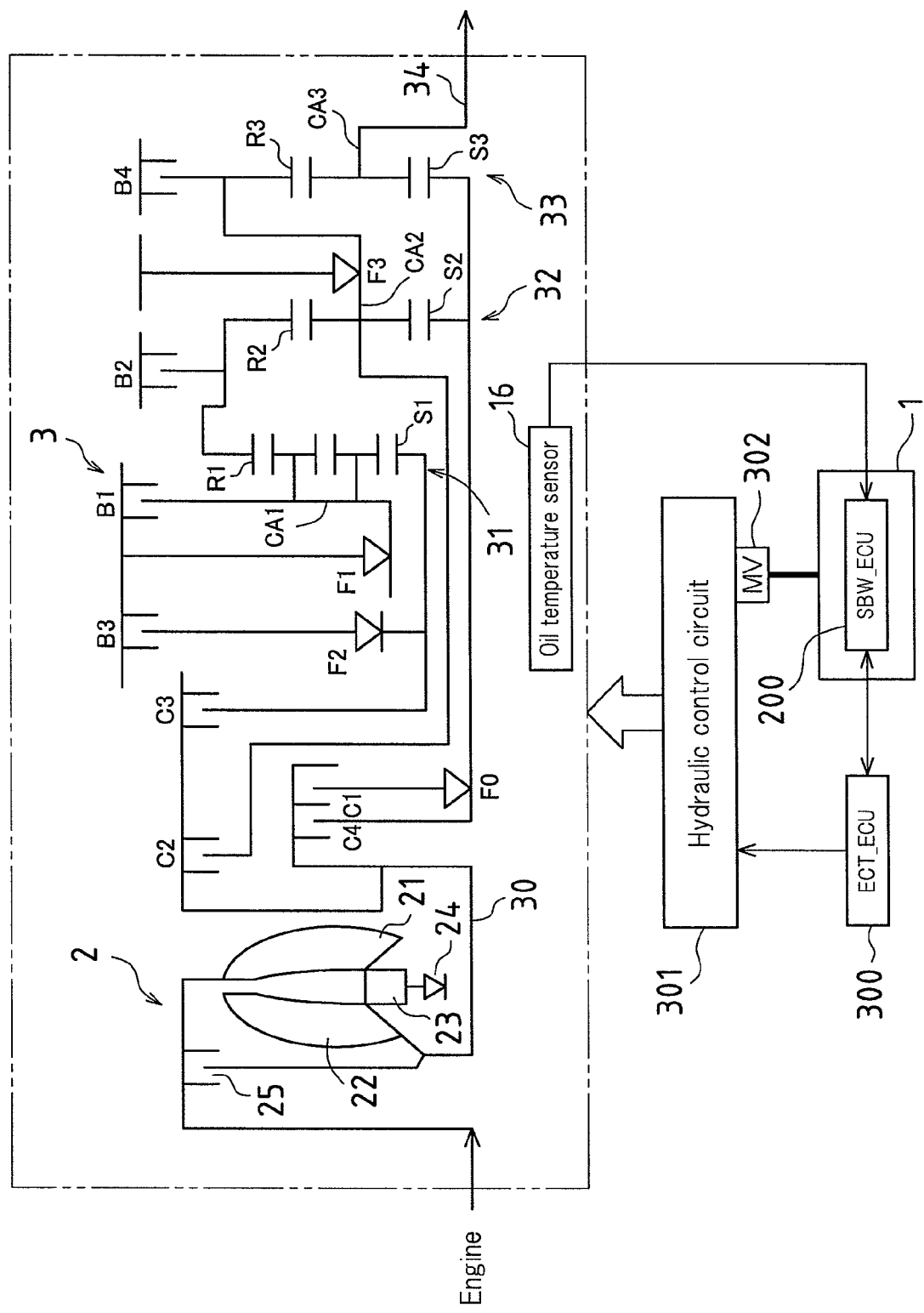
FIG. 2 shows both of a schematic configuration diagram that shows an example of an automatic transmission and a block diagram of the control system.

Hereinafter, the schematic configuration of the automatic transmission 3 (including a torque converter 2) will be described with reference to FIG. 2. The automatic transmission 3 is approximately symmetrically configured relative to a center line, and the half below the center line is omitted in FIG. 2.

First, the torque converter 2 is disposed on the input-side of the automatic transmission 3. The torque converter 2 includes an input shaft-side pump impeller 21, an output shaft-side turbine impeller 22, a stator 23 that manifests a torque amplification function, and a one-way clutch 24. The torque converter 2 transmits power between the pump impeller 21 and the turbine impeller 22 via a fluid.

The toque converter 2 includes a lock-up clutch 25 that puts the input side and the output side in a directly linked state, and by completely engaging the lock-up clutch 25, the pump impeller 21 and the turbine impeller 22 rotate as a single body. Also, by engaging the lock-up clutch 25 in a predetermined slip state, the turbine impeller 22 rotates following the pump impeller 21 with a predetermined slip amount during driving. The torque converter 2 and the automatic transmission 3 are connected by a rotating shaft.

The automatic transmission 3 is a planetary gear transmission that includes a double pinion-type first planetary gear apparatus 31, a single pinion-type second planetary gear apparatus 32, and a single pinion-type third planetary gear apparatus 33. Power output from an output shaft 34 of the automatic transmission 3 is transmitted to drive wheels via a propeller shaft, a differential gear, a drive shaft, and the like.

A sun gear S1 of the first planetary gear apparatus 31 of the automatic transmission 3 is selectively linked via a clutch C3 to an input shaft 30. Furthermore, the sun gear S1 is selectively linked via a one-way clutch F2 and a brake B3 to a housing, and rotation in the reverse direction (direction opposite the rotation of the input shaft 30) is prevented. A carrier CA1 of the first planetary gear apparatus 31 is selectively linked via a brake B1 to the housing, and rotation in the reverse direction is always prevented by a one-way clutch F1 disposed parallel to the brake B1. A ring gear R1 of the first planetary gear apparatus 31 is linked as a single body to a ring gear R2 of the second planetary gear apparatus 32, and is selectively linked via a brake B2 to the housing.

A sun gear S2 of the second planetary gear apparatus 32 is linked as a single body to a sun gear S3 of the third planetary gear apparatus 33, and is selectively linked via a clutch C4 to the input shaft 30. Furthermore, the sun gear S2 is selectively linked via a one-way clutch F0 and a clutch C1 to the input shaft 30, and rotation in the reverse direction relative to the input shaft 30 is prevented.

A carrier CA2 of the second planetary gear apparatus 32 is linked as a single body to a ring gear R3 of the third planetary gear apparatus 33, is selectively linked via a clutch C2 to the input shaft 30, and is selectively linked via a brake B4 to the housing. Furthermore, rotation of the carrier CA2 in the reverse direction is always prevented by a one-way clutch F3 disposed parallel to the brake B4. Also, a carrier CA3 of the third planetary gear apparatus 33 is linked as a single body to the output shaft 34.

The engagement/release state of the clutches C1 to C4, the brakes B1 to B4, and the one-way clutches F0 to F3 of the above-described automatic transmission 3 is shown in the operation table in FIG. 3. In the operation table in FIG. 3, "X" indicates engagement and a blank space indicates release. Also, "Y" indicates engagement during engine braking, and "Z" indicates engagement unrelated to power transmission.

As shown in FIG. 3, in the automatic transmission 3 in this example, in the first (1st) forward gear (D), the clutch C1 is engaged, and the one-way clutches F0 and F3 operate. In the second (2nd) forward gear, the clutch C1 and the third brake B3 are engaged, and the one-way clutches F0, F1, and F2 operate.

In the third (3rd) forward gear, the clutches C1 and C3 are engaged, the brake B3 is engaged, and the first one-way clutches F0 and F1 operate. In the fourth (4th) forward gear, the clutches C1, C2, and C3 are engaged, the brake B3 is engaged, and the one-way clutch F0 operates.

In the fifth (5th) forward gear, the clutches C1, C2, and C3 are engaged, and the brakes B1 and B3 are engaged. In the sixth (6th) forward gear, the clutches C1 and C2 are engaged, and the brakes B1, B2, and B3 are engaged.

Meanwhile, in the reverse gear (Rev), the clutch C3 is engaged, the brake B4 is engaged, and the one-way clutch F1 operates.

As described above, in the automatic transmission 3 in this example, a gear (gear position) is set by engaging or releasing the clutches C1 to C4, the brakes B1 to B4, the one-way clutch F0 to F3, and the like, which are frictionally engaging elements, in a predetermined state. Engagement/release of the clutches C1 to C4 and the brakes B1 to B4 is controlled by a hydraulic control circuit 301.

The hydraulic control circuit 301 includes a manual valve 302 that is driven by the shift-switching apparatus 1, a linear solenoid valve and an on/off solenoid valve (not shown), and the like. By controlling excitation/non-excitation of each solenoid valve, or controlling switching of the manual valve 302 using the shift-switching apparatus 1, the hydraulic control circuit 301 is switched, and, thus, engagement/release of the clutches C1 to C4 and the brakes B1 to B4 of the automatic transmission 3 can be controlled.

Excitation/non-excitation of the linear solenoid valve and the on/off solenoid valve of the hydraulic control circuit 301 is controlled by a solenoid control signal (instruction hydraulic signal) from the ECT_ECU 300.

Here, the ECT_ECU 300 outputs a lock-up clutch control signal to the torque converter 2. The engagement pressure of the lock-up clutch 25 is controlled based on this lock-up clutch control signal. Furthermore, the ECU 100 outputs a solenoid control signal (hydraulic command signal) to the hydraulic control circuit 301 of the automatic transmission 3. The linear solenoid valve, the on/off solenoid valve, and the like of the hydraulic control circuit 301 are controlled based on this solenoid control signal, and the clutches C1 to C4, the brakes B1 to B4, the one-way clutches F0 to F3, and the like are engaged or released in a predetermined state so as to constitute a predetermined gear (the 1st to 6th gears).

Furthermore, when a clutch release instruction is transmitted from the SBW_ECU 200, the ECT_ECU 300 releases the frictionally engaging elements of the automatic transmission 3 and blocks power transmission from the engine to the drive wheels. For example, when the current shift range is "D range", the ECT_ECU 300 releases the clutch C1 to put the automatic transmission 3 in a neutral state (a state in which power transmission is blocked). Furthermore, when the current shift range is "R range", the ECT_ECU 300 releases the clutch C3 and the brake B4 to put the automatic transmission 3 in a neutral state (a state in which power transmission is blocked).

Shift Range-Switching Mechanism

Next, the shift range-switching mechanism 100 will be described with reference to FIG. 4.

The shift range-switching mechanism 100 in this example is a mechanism that switches the shift range of the automatic transmission 3 between the P range, the R range, the N range, and the D range. The motor 101, which is a drive source for the shift range-switching mechanism 100, is, for example, a synchronous motor such as a switched reluctance motor (SR motor) or the like, and includes a deceleration mechanism 102. The motor 101 further includes the encoder 103 that detects the rotational angle of the rotor. The encoder 103 is configured from, for example, a magnetic rotary encoder, and outputs a pulse signal to the SBW_ECU 200 in synchronization with a rotation of the rotor of the motor 101.

A rotational axis of the deceleration mechanism 102 is fitted and linked to the output shaft 105, and is provided with the NSW sensor 104 that detects the rotational angle of the output shaft 105. The detent lever 106 for switching the manual valve 302 of the hydraulic control circuit 301 of the automatic transmission 3 is fixed to the output shaft 105.

A spool valve 303 of the manual valve 302 is linked to the detent lever 106. When the motor 101 rotates the output shaft 105 and the detent lever 106 as a single body, the operation amount of the manual valve 302 (the position of the spool valve 303) is switched, and the range of the automatic transmission 3 is switched to any one of the P range, the R range, the N range, and the D range.

Four recess portions 106a for holding the spool valve 303 of the manual valve 302 at positions respectively corresponding to the P range, the R range, the N range, and the D range are formed in the detent lever 106.

A detent spring (plate spring) 107 is disposed above the detent lever 106. The detent spring 107 is fixed to the manual valve 302 as a cantilever. A roller 108 is attached to a tip end portion of the detent spring 107. The roller 108 is pressed against the detent lever 106 by an elastic force of the detent spring 107. Furthermore, when the roller 108 is fitted to a recess portion 106a of the detent lever 106 corresponding to a target shift range, the detent lever 106 is held at a rotational angle corresponding to the target shift range, and the spool valve 303 of the manual valve 302 is held at a position corresponding to the target shift range position.

Meanwhile, an L-shaped parking rod 109 is fixed to the detent lever 106. A cam 110 having a conical (tapered) form is disposed at a tip end portion of the parking rod 109, and a lock lever 111 is in contact with the outer circumferential face (cam face) of the cam 110. The lock lever 111 moves vertically about a rotating shaft 112 according to the position of the cam 110, a lock claw 111a of the lock lever 111 becomes engaged with a parking gear 113 or moves away therefrom as a result of that vertical movement, and, thus, rotation of the parking gear 113 can be locked or unlocked. Furthermore, the parking gear 113 is disposed on the output shaft 34 of the automatic transmission 3, and when the parking gear 113 is locked by the lock lever 111, the drive wheels of the vehicle are held in a state where rotation thereof is stopped (parking state).

In the above-described shift range-switching mechanism 100, when the P range has been selected, the parking rod 109 moves in a direction of approach to the lock lever 111, a large diameter portion of the cam 110 pushes up the lock lever 111, the lock claw 111a of the lock lever 111 is fitted to the parking gear 113, the parking gear 113 becomes locked, and, thus, the output shaft 34 (drive wheels) of the automatic transmission 3 is held in a locked state (parking state).

Meanwhile, when a shift range other than the P range has been selected, the parking rod 109 moves in a direction away from the lock lever 111, and following this movement, the lock lever 111 that has been in contact with the large diameter portion of the cam 110 is moved away therefrom and brought into contact with the small diameter portion and the lock lever 111 moves down. Accordingly, the lock claw 111a of the lock lever 111 moves away from the parking gear 113, the parking gear 113 is unlocked, and the output shaft 34 of the automatic transmission 3 is held in a state where rotation thereof is possible (a drivable state).

In a vehicle in which the above-described shift-switching apparatus 1 is mounted, when a driver operates the shift switch 13, the SBW_ECU 200 sets a target rotational angle (target encoder count value) corresponding to the shift range selected by the shift switch 13, starts providing electrical power to the motor 101, and performs a feedback control (F/B control) of the motor 101 so as to stop the motor 101 at a position at which a detected rotational angle (encoder count value) of the motor 101 matches the target rotational angle.

Furthermore, the SBW_ECU 200 reads an output signal from the NSW sensor 104, determines, based on that output signal, a current rotational angle of the output shaft 105 (operation amount of the manual valve 302), that is, which of the P range, the R range, the N range, and the D range is the current range, compares the result of that determination with the shift range selected through the shift operation (target shift range), and determines whether or not the shift range switching has been properly performed.

Shift Switching Control

Figure 5:
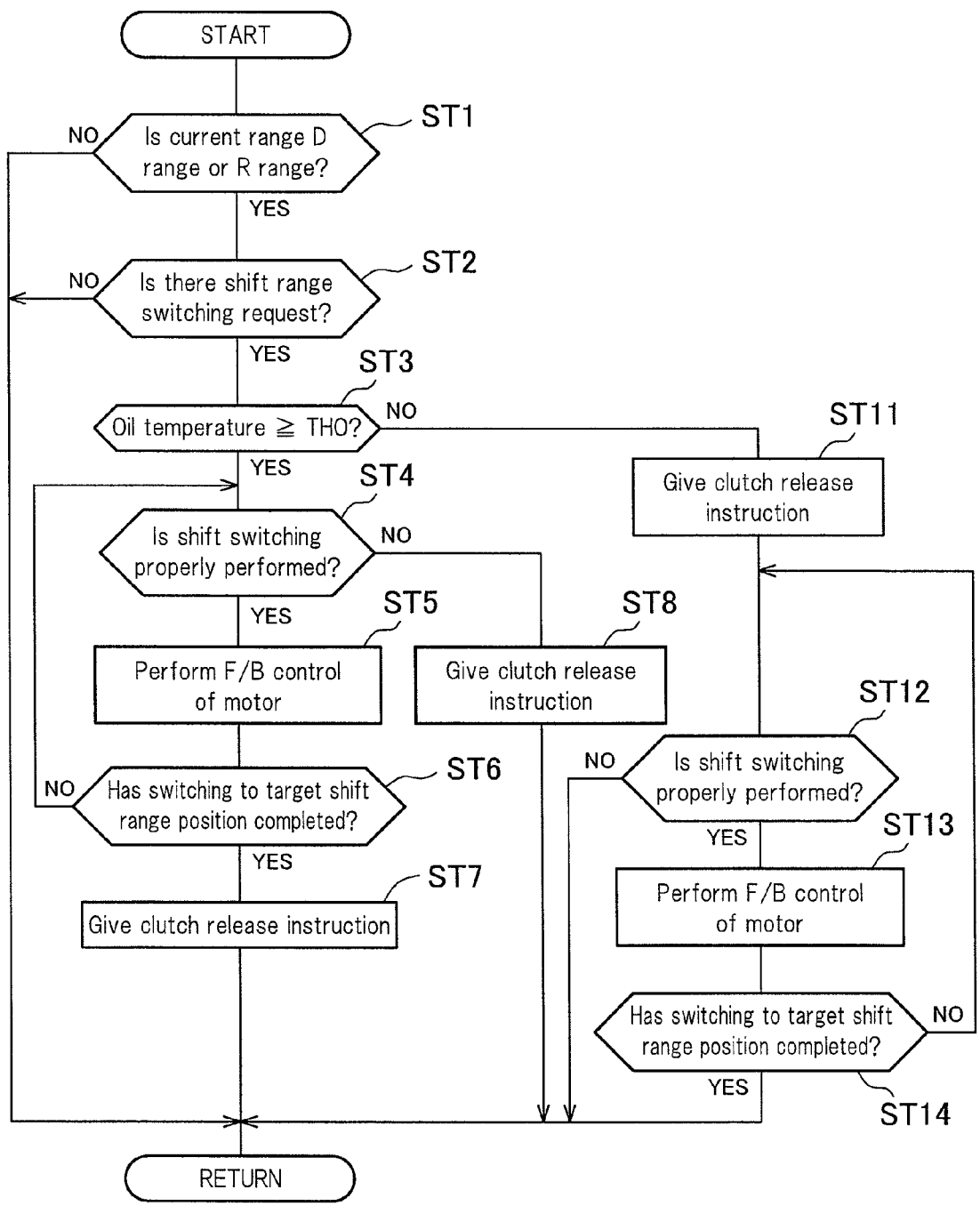
FIG. 5 is a flowchart showing an example of a shift switching control.
Figure 6:
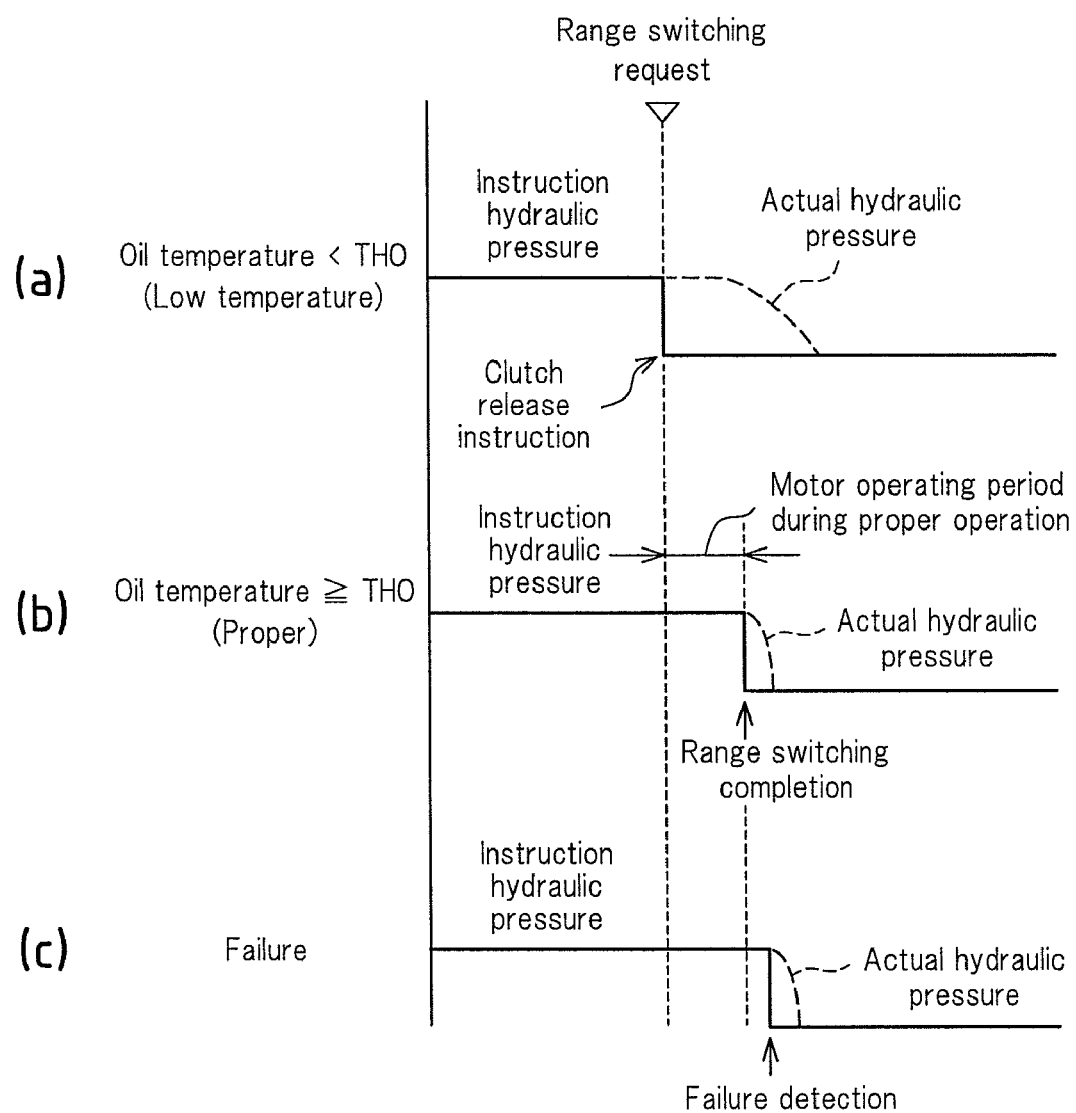
FIG. 6 is a timing chart showing an example of a shift switching control.

Next, a shift switching control (including a failsafe control) executed in this example will be described with reference to the flowchart in FIG. 5 and the timing chart in FIG. 6. The control routine in FIG. 5 is executed repeatedly at a prescribed interval by the SBW_ECU 200.

In step ST1, it is determined based on the output signal from the NSW sensor 104 whether or not the current shift range is "D range" or "R range". If the result of that determination is a positive determination (for example, the current shift range is "R range"), the procedure proceeds to step ST2. If the result of the determination in step ST1 is a negative determination, this routine is left once.

In step ST2, it is determined whether or not there is a shift range switching request. More specifically, it is determined based on signals from the shift switch 13 and the P switch 12 whether or not the driver has performed a shift range switching operation. If the result of the determination in step ST2 is a negative determination (there is no shift switching request), this routine is left once. If the result of the determination in step ST2 is a positive determination (there is a shift switching request), the procedure proceeds to step ST3. Here, in the case where there is a shift range switching request (from the R range to the D range, for example), the requested shift range (the D range, for example) is hereinafter referred to as a "target shift range".

In step ST3, the oil temperature (the temperature of working oil in the automatic transmission 3) is sampled based on an output signal from the oil temperature sensor 16, and it is determined whether or not the sampled oil temperature is at least a threshold THO (the freezing point, for example). If the result of the determination in step ST3 is a negative determination, that is, if the oil temperature is low (oil temperature<THO), a clutch release instruction is transmitted to the ECT_ECU 300 in order to release the clutches of the automatic transmission 3 at the same time as the shift switching request (step ST11).

When the clutch release instruction from the SBW_ECU 200 is received, the ECT_ECU 300 sets an instruction hydraulic pressure of the automatic transmission 3 to a clutch release hydraulic pressure (see FIG. 6(a)) to release the clutches of the automatic transmission 3. For example, in the case where the current shift range is "R range", the clutch C3 and the brake B4 of the automatic transmission 3 are released at the same time as the shift switching request, the automatic transmission 3 is put in a neutral state, and the power transmission is blocked. After the power transmission has been blocked (after the clutch release instruction), if the switching of the shift-switching apparatus 1 is being properly performed (low temperature, proper), a control of the motor 101 is performed.

More specifically, in step ST12, it is determined whether or not shift switching of the shift-switching apparatus 1 is properly performed. If the result of that determination is a positive determination, the procedure proceeds to step ST13. If the result of the determination in step ST12 is a negative determination, this routine is left once. Here, determination of whether the shift switching is properly performed or not properly performed (failure detection) will be described later.

In step ST13, a feedback control (F/B control) of the motor 101 of the range-switching mechanism 100 is performed. More specifically, a feedback control of the motor 101 is performed such that a detected rotational angle (encoder count value) of the motor 101 matches a target rotational angle (target encoder count value) corresponding to the target shift range. After the feedback control of the motor 101 has been performed, it is determined based on an output signal from the NSW sensor 104 whether or not the switching to the target shift range position has completed (step ST14). When the result of that determination becomes a positive determination, this routine is left once.

Here, in step ST3, in the case where the oil temperature cannot be detected based on an output signal from the oil temperature sensor 16, the clutches of the automatic transmission 3 are released at the same time as the shift switching request.

On the other hand, if the result of the determination in step ST3 is a positive determination (oil temperature≧THO), the procedure proceeds to step ST4. In step ST4, it is determined whether or not the shift switching of the shift-switching apparatus 1 is properly performed. If the result of that determination is a positive determination, the procedure proceeds to step ST5. Here, determination of whether the shift switching is properly performed or not properly performed (failure detection) will be described later.

In step ST5, a feedback control (F/B control) of the motor 101 of the range-switching mechanism 100 is performed. More specifically, a feedback control of the motor 101 is performed such that a detected rotational angle (encoder count value) of the motor 101 matches a target rotational angle (target encoder count value) corresponding to the target shift range. After the feedback control of the motor 101 has been performed, it is determined based on an output signal from the NSW sensor 104 whether or not the switching to the target shift range position has completed (step ST6). If the result of that determination is a positive determination, a clutch release instruction is given to the ECT_ECU 300 (step ST7). The ECT_ECU 300 releases the clutches of the automatic transmission 3 in response to the clutch release instruction from the SBW_ECU 200. For example, in the case where the current shift range is "R range" and the clutch C3 and the brake B3 of the automatic transmission 3 are released. Furthermore, in the case where the shift switching request in step ST2 is [from the R range to the D range], the clutch C3 and the brake B3 of the automatic transmission 3 are released, and the clutch C1 is engaged.

Here, in the case where the shift switching request is [from the R range to the N range] or [from the R range to the P range], the clutch C3 and the brake B3 of the automatic transmission 3 are released, and then the neutral state is maintained.

Determination of Proper/not Proper

Here, in this example, if the actual shift range detected by the NSW sensor 104 does not match the target shift range even after the elapse of a given period (period longer than the operating period (switching period) of the motor 101 during a proper operation) after a shift range switching request is given (a positive determination is made in step ST2), it is determined that a failure has occurred in the shift-switching apparatus 1 (failure detection). On the other hand, if the actual shift range matches the target shift range within a given period (period longer than the operating period of the motor 101 during a proper operation) after the shift range switching request, it is determined that the shift-switching apparatus 1 is properly operating. This sort of determination processing is executed in step ST4 and step ST12.

If the result of the determination in step ST4 is a negative determination (if a failure is detected), the procedure proceeds to step ST8. In step ST8, a clutch release instruction is given to the ECT_ECU 300. The ECT_ECU 300 releases the clutches of the automatic transmission 3 in response to the clutch release instruction from the SBW_ECU 200. For example, in the case where the current shift range is "R range", the clutch C3 and the brake B3 of the automatic transmission 3 are released, the automatic transmission 3 is put in a neutral state, and the power transmission is blocked.

If the result of the determination in step ST12 is a negative determination (if a failure is detected), switching of the shift-switching apparatus 1 is not performed, and this routine is left once. Here, step ST12 and step ST4 described above correspond to the failure-detecting means.

As described above, according to the shift switching control in this example, in consideration of the fact that when the temperature of working oil in the automatic transmission 3 is low, the viscosity of the working oil is high and response for clutch release (response for clutch actual hydraulic pressure) is poor, in the case where the oil temperature at the time of a shift switching request is low as shown in FIG. 6(a), the clutches of the automatic transmission 3 are released by giving a clutch release instruction at the same time as the shift switching request (steps ST3 and ST11) regardless of the result of detection of a shift switching failure. Thus, the clutch release delay in the case where an oil temperature is low can be cancelled, and vehicle movement can be prevented.

On the other hand, in the case where the shift-switching apparatus 1 is properly operating and the working oil temperature is not low, as shown in FIG. 6(b), the clutches of the automatic transmission 3 are released by giving a clutch release instruction (steps ST3 to ST7) when the operation of the motor 101 of the shift-switching apparatus 1 completes (switching to the target shift range completes), that is, at an ordinary control time. Thus, the release-side clutch of the automatic transmission 3 is not released too early. Accordingly, for example, a garage shock occurring when switching a shift range from the R range to the D range or from the D range to the R range can be suppressed.

Furthermore, as shown in FIG. 6(c), in the case where a shift switching failure is detected when the working oil temperature is not low, the clutches of the automatic transmission 3 are released by giving a clutch release instruction when the shift switching failure is detected, and, thus, the power transmission in the case where there is a shift switching failure can be blocked at an appropriate time. That is to say, in the case where the working oil temperature is not low, response for clutch release is good, and, thus, even when the clutches are released (the power is blocked) after a shift switching failure is detected, no clutch release delay occurs, and vehicle movement (rearward) can be prevented.

OTHER EMBODIMENTS

In the above-described example, in the case where the working oil temperature at the time of a shift switching request is lower than the threshold THO (below the freezing point), the power is blocked by releasing the release-side clutch of the automatic transmission 3 at the same time as the shift switching request. However, the present invention is not limited to this.

Figure 7:
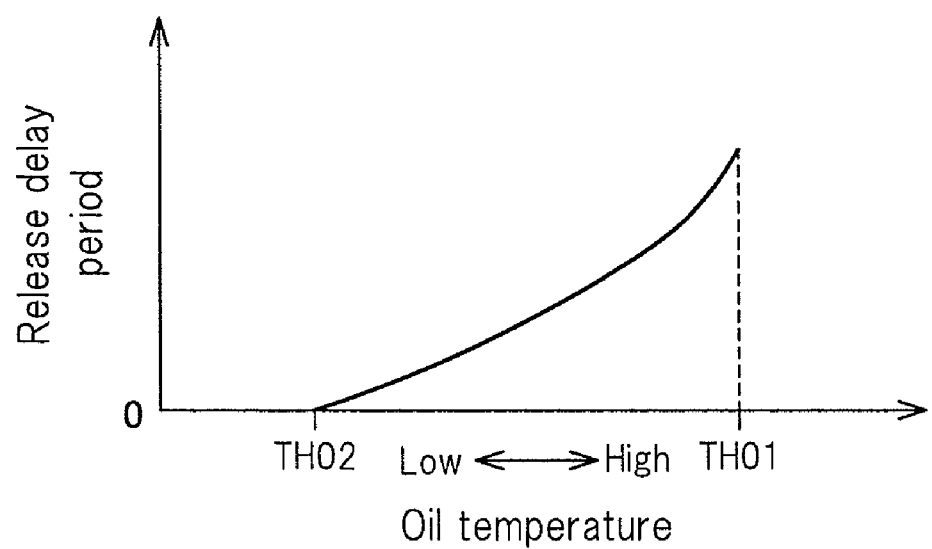
FIG. 7 is a graph showing an example of a map that calculates a release delay period of a clutch of the automatic transmission.

For example, a map for a calculating a release delay period (period from a shift switching request to a clutch release instruction) as shown in FIG. 7 may be made through experiments, calculations, and the like, and stored in a ROM or the like of the SBW_ECU 200, a release delay period may be calculated with reference to the map based on an oil temperature detected by the oil temperature sensor 16, and a time for releasing the clutches may be set based on that release delay period. In the map shown in FIG. 7, in the case where the oil temperature detected by the oil temperature sensor 16 is lower than THO2 (−20° C., for example), the release delay period is set to 0 ms (at the same time as the shift switching request). Furthermore, in the case where the oil temperature is at least THO2 and lower than THO1 (0° C., for example), the release delay period is set so as to be longer as the oil temperature detected by the oil temperature sensor 16 is higher. In the case where the detected oil temperature is at least the threshold THO1, the clutches are released at an ordinary control time.

In the above-described example, an example is shown in which the present invention is applied to a shift range-switching mechanism that switches the shift range between P, R, N, and D. However, the present invention is not limited to this, and also can be applied, for example, to any other shift range-switching mechanisms, such as a shift range-switching mechanism that includes not only the P, R, N, and D ranges but also a second range (2) and a low range (L). Furthermore, the present invention also can be applied to a range-switching mechanism that selectively performs switching between two ranges consisting of the P range and the non-P range in conjunction with rotation of the detent lever 106.

In the above-described example, the NSW sensor 104 detects the rotational angle of the output shaft 105 (the rotational angle of the detent lever 106). However, the NSW sensor 104 may detect not the rotational angle but, for example, an operation amount (rotational angle, movement amount, etc.) of a constituent element that is driven as a single body with the output shaft 105, such as an operation amount of the spool valve 303 of the manual valve 302.

In the above-described example, the power transmission is blocked by releasing the frictionally engaging elements of the hydraulic automatic transmission mounted in the vehicle, but the present invention is not limited to this. A hydraulic power-blocking means (a clutch, for example) separate from the automatic transmission may be provided in a power transmission path from the output shaft of the engine to the drive wheels, and the power transmission may be blocked by operating the hydraulic power-blocking means.

In the above-described example, an example is shown in which the present invention is applied to the control apparatus of the vehicle in which a planetary gear transmission that sets a gear ratio using clutches, brakes, and a planetary gear apparatus is mounted. However, the present invention is not limited to this, and also can be applied to control apparatuses of vehicles in which a stepless transmission, such as a belt-driven stepless transmission (CVT), is mounted.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

INDUSTRIAL APPLICABILITY

The present invention is useful for a control apparatus of a vehicle in which a by-wire shift switching apparatus that switches a shift range of an automatic transmission using an actuator is mounted, and is advantageous in that power transmission can be blocked at an appropriate time when there is a shift switching failure, and moreover, the control apparatus is not particularly influenced by the temperature state of working oil in the power-blocking means.

The invention claimed is:

1. A control apparatus of a vehicle in which a by-wire shift-switching apparatus that switches a shift range using an actuator is mounted, comprising:
    means for blocking power transmission from a drive source to drive wheels of the vehicle;
    means for detecting a working oil temperature of the blocking means; and
    means for detecting a failure of the by-wire shift-switching apparatus;
    wherein, in a case where the working oil temperature is lower than a preset threshold, the power transmission is blocked regardless of a result of the detecting means.

2. The control apparatus of the vehicle according to claim 1, wherein, in a case where the working oil temperature is at least the preset threshold, the power transmission is blocked based on the detecting means detecting a failure of the by-wire shift-switching apparatus.

3. The control apparatus of the vehicle according to claim 1, wherein the blocking means includes releasing a frictionally engaging element of a hydraulic automatic transmission mounted in the vehicle in order to block the power transmission.

4. The control apparatus of the vehicle according to claim 3, comprising means for detecting a working oil temperature of the hydraulic automatic transmission,
    wherein, when a current shift range is a drive range or a reverse range, in a case where the working oil temperature of the hydraulic automatic transmission at a time of a shift switching request is lower than the preset threshold, the power transmission is blocked by releasing the frictionally engaging element of the hydraulic automatic transmission at a same time as the shift switching request, and in a case where the working oil temperature of the hydraulic automatic transmission is at least the preset threshold, the power transmission is blocked by releasing the frictionally engaging element of the hydraulic automatic transmission when a failure of the by-wire shift-switching apparatus is detected.

5. A control apparatus of a vehicle in which a by-wire shift-switching apparatus that switches a shift range using an actuator is mounted, comprising:
    means for blocking power transmission from a drive source to drive wheels of the vehicle;
    means for detecting a working oil temperature of the blocking means; and
    means for detecting a failure of the by-wire shift-switching apparatus;
    wherein, in a case where the working oil temperature is lower than a preset threshold, the power transmission is blocked before a failure of the by-wire shift-switching apparatus is detected.

* * * * *